Jan. 8, 1929.
R. BURKE
1,697,902
CULINARY CHOPPER
Filed May 3, 1928
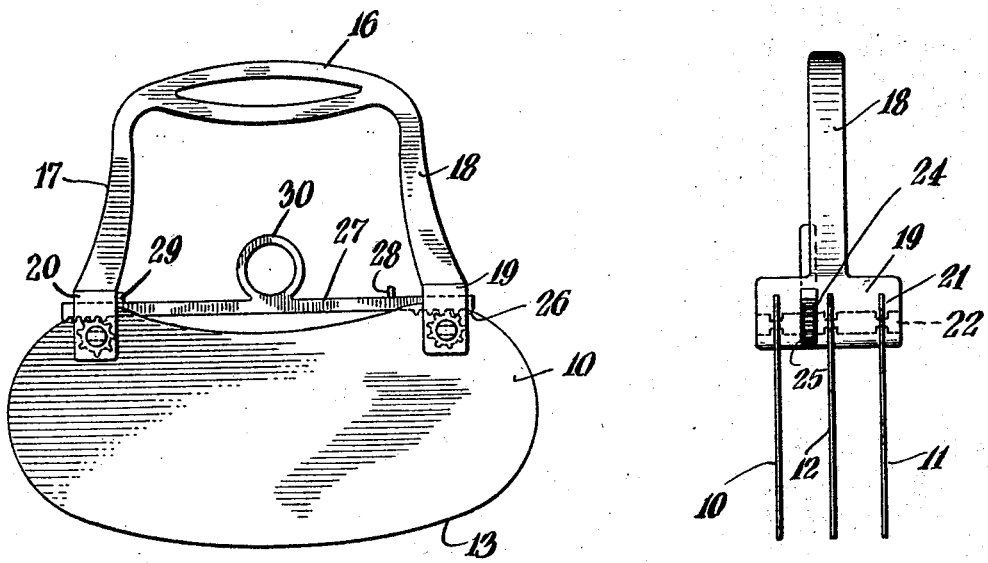
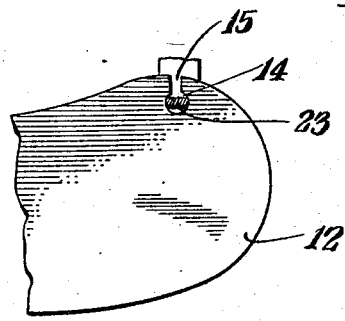
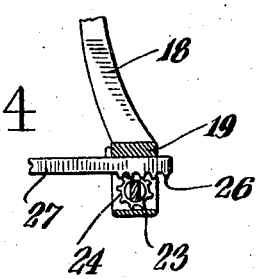
INVENTOR
*R. Burke*
BY *J. Ledermann*
ATTORNEY Patented Jan. 8, 1929.

1,697,902

UNITED STATES PATENT OFFICE.

REGINA BURKE, OF LYNDHURST, NEW JERSEY.

CULINARY CHOPPER.

Application filed May 3, 1928. Serial No. 274,727.

The main object of this invention is to provide a chopper used in the culinary pursuit which is provided with a plurality of blades so constructed as to be removable from the handle for purposes of replacement or cleaning.

Another object of this invention is to provide a culinary chopper equipped with a plurality of blades which may be completely detached from the chopper by the operation of a latching attachment provided on the device.

The above and other objects will become apparent in the description below in which characters of reference refer to like-named parts in the drawing.

Referring briefly to the drawing, Figure 1 is a front elevational view of the culinary chopper showing the blades mounted on the handle.

Figure 2 is an end elevational view of Figure 1.

Figure 3 is a fragmentary front elevational view of a portion of one of the blades showing the means for locking these blades on the handle.

Figure 4 is a fragmentary sectioned elevational view of one end of the handle showing the means thereon for actuating the latching mechanism.

Referring in detail to the drawing, the numerals 10, 11 and 12 indicate a plurality of knives. These knives are formed from flat sheets of material and are kidney shaped, having a curved lower cutting edge 13. Near the ends of these knife members 10, 11 and 12 substantially circular openings 14 are provided which communicate with the edge of the blades through channels 15. These channels are used when the locking mechanism of the handle, which will be hereinafter described, is projected into the opening 14 of the knife blades.

The culinary chopper consists of two units: a handle and a plurality of knives which latter are arranged side by side and extend parallel to each other. The handle comprises an elongated grasp bar 16 from the ends of which a pair of slenderly curved arms 17 and 18 extend downwardly. The lower ends or extremities of these arms 17 and 18 terminate in substantially rectangular blocks 19 and 20. In these blocks slits 21, of the same number as the knives, are formed. Each of the blocks 19 and 20 has a shaft 22 rotatably mounted therein. At the positon where the shaft passes through the slitted portions 21 in the blocks 19 and 20 the shaft is reduced so as to form a rectangular member 23 in cross section. This rectangular member 23 has a width slightly smaller than the width of the channel 15 in the knife blades 10, 11 and 12 so that these particular portions 23 may readily be passed through the channels and into the openings 14, the length of said members 23 being equal to the diameter of the openings 14. On each of the shafts 22 a relatively small pinion 24 is rigidly mounted. This pinion is housed in a recess 25 provided in the blocks 19 and 20. The pinions are engaged by the teeth 26 of a rack bar 27. This rack bar passes slidably through both of the blocks 19 and 20 and the extreme ends thereof are provided with the teeth 26 upon the under side so that the pinions 24 may readily mesh with the rack bar. Limiting pins 28 and 29 are mounted on the rack bar 27 near its ends and limit the movement of the rack bar to a distance equal to ninety degrees rotation of the pinions. Intermediate the length of the rack bar a finger ring 30 is formed on the same so that the rack bar may be manipulated to release or lock the knife blades securely to the handle.

This culinary chopper is particularly adapted to be used in dividing fresh mushrooms, onions or similar other food stuffs, such as vegetables, into smaller parts. In chopping assorted vegetables the knife blades on account of their being a plurality in the device, become gummed with the vegetable juices and, were the knife blades intact with the handles, the dried juices could not be removed from the blades, thereby causing an unsanitary condition. For this reason the knife blades are constructed so that they may be completely detached from the handle and thoroughly cleansed. When member 23 of the shafts 22 is in the position shown in Figure 3 in the openings 14 of the knife blades 10, 11 and 12, the knife blades are securely locked to the handle. To permit detachment of these knife blades the finger ring 30 is engaged by one of the fingers of the hand and slid from the position shown in Figure 1 to the opposed position, in which the limiting pin will ride into contact with the block 19. This movement of the rack bar 27 will rotate the pinions and shafts 24 and 22 respectively in unison exactly ninety degrees. This causes the widths of members 23 to align with the outline of the channels 15 and, when the channels and members 23 are so aligned, the knife blades 10, 11 and 12 are capable of falling from place. In securing the knife blades in place members 23 must be at the position shown in Figure 4 so that the widths of these members 23 may readily be inserted into the channels 15 as the blades 10, 11 and 12 are inserted into the slits. When the insertion of these members into the openings 14 has been completed the rack bar is again shifted to the position shown in Figure 1 until the limiting pin 29 contacts with the side of the block 20.

It is to be noted that certain changes in form and construction may be made without departing from the spirit and scope of the invention.

I claim:

1. In a culinary chopper, a plurality of blades, a U-shaped handle, said knife blades having openings therein, and channels communicating with the openings and the edge of the blades, shafts on said handle, said shafts having reduced portions adapted to pass thru said channels into said openings, said reduced portions being rectangular in outline, pinions on said shaft and a rack bar slidable in the ends of said handle for rotating said shafts in unison to lock said reduced portions in the openings of said knife blades.

2. In a culinary chopper, a plurality of blades, a handle, said knife blades having openings therein, and channels communicating with the openings and the edge of the blades, shafts on said handle, said shafts having reduced portions adapted to pass thru said channels into said openings, said reduced portions being rectangular in outline, pinions on said shafts, and reciprocating means on said handle bar for rotating said pinions ninety degrees to release or secure said knife blades to the handles.

3. In a culinary chopper, a plurality of blades, a handle, said knife blades having openings therein, and channels communicating with the openings and the edge of the blades, shafts on said handle, said shafts having reduced portions adapted to pass thru said channels into said openings, said reduced portions being rectangular in outline, pinions on said shafts, a rack bar engaging said pinions for rotating the latter ninety degrees, and means for limiting the movement of said rack bar.

4. In a culinary chopper, a plurality of blades, a handle, said knife blades having openings therein, and channels communicating with the openings and the edge of the blades, shafts on said handle, said shafts having reduced portions adapted to pass thru said channels into said openings, said reduced portions being rectangular in outline, pinions on said shafts, a rack bar engaging said pinions for rotating the latter ninety degrees, limiting pins on said rack bar for restricting the distance moved by said rack bar to cause said pinions to be rotated exactly ninety degrees.

In testimony whereof I affix my signature.

REGINA BURKE.